United States Patent
Unckrich

Patent Number: 5,722,727
Date of Patent: Mar. 3, 1998

[54] ARTICULATED FITTING FOR VEHICLE SEATS, IN PARTICULAR MOTOR VEHICLE SEATS

[75] Inventor: Hermann Unckrich, Alsenz, Germany

[73] Assignee: Keiper Recaro GmbH & Co., Remscheid, Germany

[21] Appl. No.: 695,164

[22] Filed: Aug. 7, 1996

[30] Foreign Application Priority Data

Aug. 23, 1995 [DE] Germany .................. 195 31 018.7

[51] Int. Cl.$^6$ ............................................ B60N 2/10
[52] U.S. Cl. ............................. 297/336; 296/65.1
[58] Field of Search ........................ 297/335, 336; 248/503.1; 296/63, 65.1

[56] References Cited

U.S. PATENT DOCUMENTS

| | | | |
|---|---|---|---|
| 4,773,693 | 9/1988 | Premji et al. | 296/65.1 |
| 4,865,377 | 9/1989 | Musser | 296/65.1 |
| 4,971,379 | 11/1990 | Rumpel et al. | 297/336 X |
| 5,022,698 | 6/1991 | Butt et al. | 296/65.1 |
| 5,224,750 | 7/1993 | Clark et al. | 297/335 X |
| 5,482,345 | 1/1996 | Bolsworth et al. | 297/336 X |
| 5,562,322 | 10/1996 | Christoffel | 296/65.1 |

*Primary Examiner*—Peter R. Brown
*Attorney, Agent, or Firm*—McAulay Fisher Nissen Goldberg & Kiel, LLP

[57] ABSTRACT

The stationary articulated part of the articulated fitting is connected at its front end with the seat part so as to be rotatable via a swivel axle. The rear end region cooperates with a stop which is fixed at the seat part. A catch hook which is articulated at the stationary articulated part so as to be swivelable engages the stop and a locking arrangement has an actuating lever which is supported at the stationary articulated part so as to be rotatable and which is spring-loaded in the locking direction. The actuating lever communicates with a locking cam which secures the catch hook. A control arm contacting the stop is held under pretensioning by the spring element which acts upon the actuating lever in the locking direction. In the release position of the catch hook, the actuating lever is held by the catch lever in a releasable manner. In order to reduce the releasing force, the locking cam, which is swivelably supported at the stationary articulated part, supports the actuating lever, which is designed as a switching plate, on an axle stub. The switching plate engages around the pin, which is fixed at the articulated part, by means of a curved elongated hole and contacts, via a support cam, a support pin which is fixed with respect to the articulated part. The switching plate can be brought into contact, via a driver face, with a release projection of the locking cam on the one hand and, on the other hand, has a locking driver for the locking cam.

7 Claims, 3 Drawing Sheets

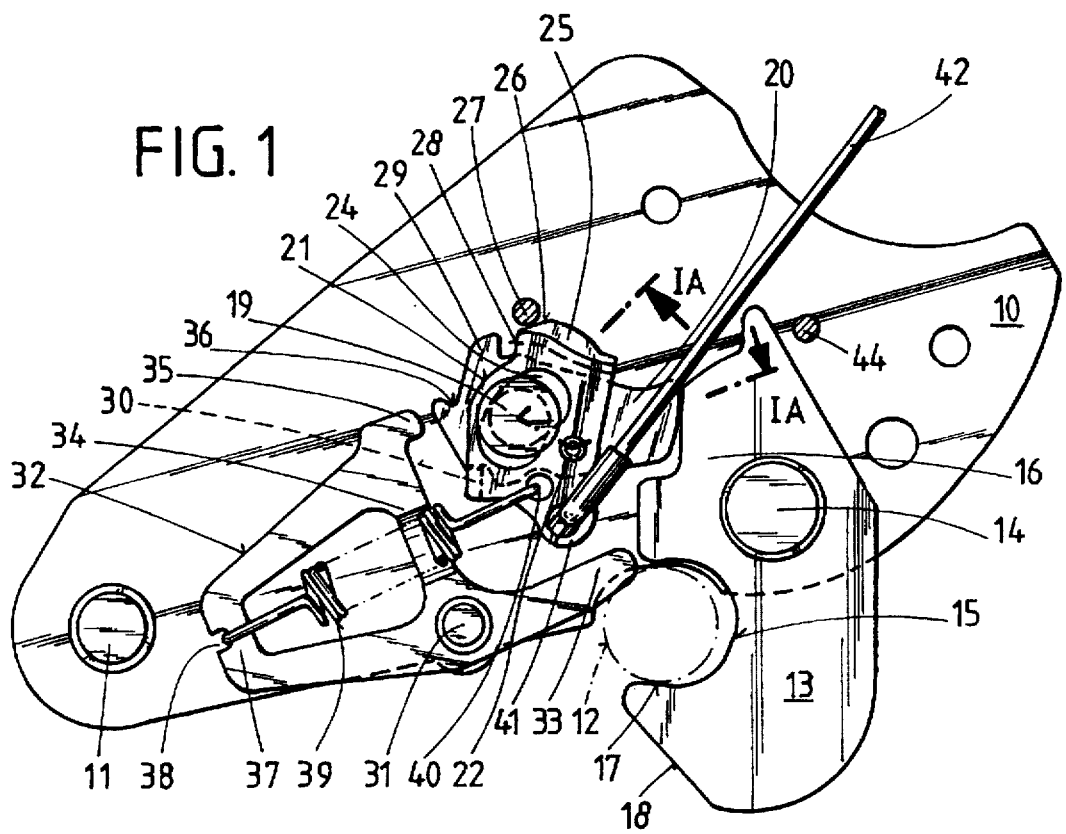
FIG. 1
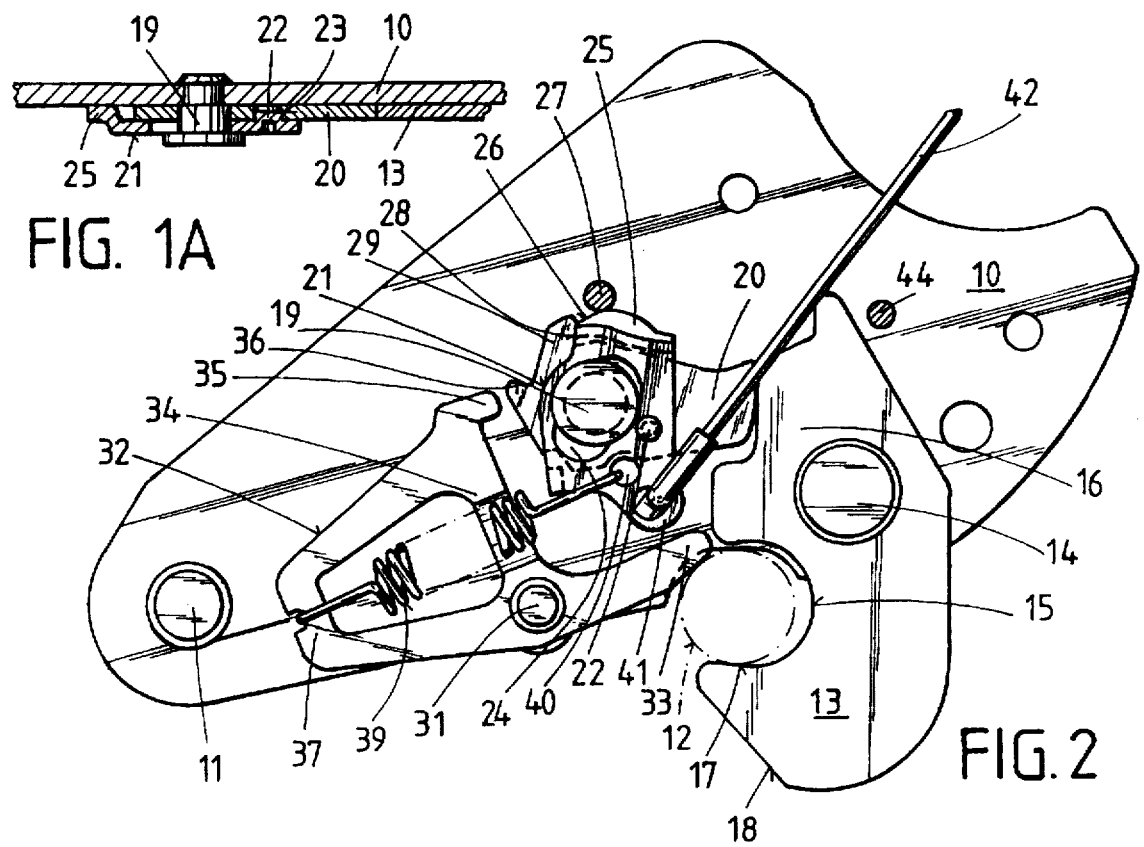
FIG. 1A
FIG. 2

ARTICULATED FITTING FOR VEHICLE SEATS, IN PARTICULAR MOTOR VEHICLE SEATS

BACKGROUND OF THE INVENTION a) Field of the Invention

The invention is directed to an articulated fitting for vehicle seats, especially motor vehicle seats, having an articulated part which is swivelable with the backrest and a stationary articulated part. The stationary articulated part is connected, by its front end remote of the articulated fitting, with the seat part of the vehicle seat so as to be rotatable via a swivel shaft, while its rear end region cooperates with a stop which is fixed at the seat part, and a catch hook provided with a hook opening or jaw is swivelably articulated at the stationary articulated part, a locking arrangement being associated with the catch hook. The locking arrangement has an actuating lever which is supported at the stationary articulated part so as to be rotatable and which is loaded by a spring element in the locking direction. The actuating lever communicates with a locking cam which secures the catch hook in its locking position in which the jaw of the hook engages behind the stop in different regions thereof. In the locking position, a catch lever with a control arm contacting the stop is held under pretensioning by the spring element which acts upon the actuating lever in the locking direction. In the release position of the catch hook, the actuating lever is held by the catch lever in order to maintain this release position in that a catch arm of the catch lever engages via a catch projection in a recess of the locking cam.

b) Description of the Related Art

An articulated fitting of the type mentioned above is known from DE 39 14 083 A1. In this known articulated fitting, an actuating lever which is constructed as a switching plate is connected with the locking cam so as to be fixed with respect to rotation relative to it, this locking cam supporting the catch hook in its locking position. In this embodiment form, the locking cam and actuating lever form a rigidly interconnected constructional unit which is swivelably supported at the stationary articulated part. The actuating lever is provided with a tension member to introduce a releasing movement into the locking cam and can be swiveled into the locking position by means of a tension spring connected with the catch lever such that the locking cam acts upon the catch hook in such a way that the latter is held in its retaining position. For this purpose, the locking cam has a catch recess in which the catch lever can engage by its catch projection in the open position in order to ensure the release position of the locking cam, especially in the swiveled forward position of the backrest. For this purpose, the catch lever has a control arm which contacts a stop when swiveling back is carried out, this stop being stationary with respect to the seat part, and disengages the catch projection from the catch recess so that the tension spring which is articulated at the actuating lever is capable of moving the actuating lever and the locking cam connected therewith into the locking position as soon as the catch hook occupies a retaining position. Since the end face contacting the catch hook has an inclined curved path lying below the self-locking region, a relatively large force must be introduced into the tension member in order to overcome the adhesion friction or blocking effect between the locking cam and the catch hook so as to move the locking cam into a releasing position before swiveling the backrest into the forward position. In a panic situation following a collision, a reaction may be brought about which would not be intentional under normal circumstances in that the occupant of the back seat pushes the backrest forward before the locking arrangement comprising the locking cam and actuating lever has been released. Due to the large lever arm of the backrest, the contact pressure force between the catch hook and the end face of the locking cam is so high that the force to be introduced into the tension member in order to overcome the adhesion friction is substantially higher than the force required to overcome the adhesion friction between the locking cam and the catch hook under normal circumstances.

OBJECT AND SUMMARY OF THE INVENTION

The primary object of the present invention is to improve a locking arrangement for an articulated fitting of the type mentioned above in such a way that it is possible to reduce the releasing force required for overcoming the adhesion friction in the case of normal unlocking as well as unlocking in a panic situation on the one hand and on the other hand so that the user notices a resistance in the event of an unintentional opening. According to the invention, this object is met in that the locking cam, which is swivelably supported on a pin which is held at the stationary articulated part, supports the actuating lever, which is designed as a switching plate, on an axle stub which is arranged at a distance radially from the pin. The switching plate engages around the pin, which is fixed at the articulated part, by means of an elongated hole, which is curved around the axle stub, and contacts, via a support cam, a support pin which is fixed with respect to the articulated part, while a driver face of the switching plate can be brought into contact with a release projection of the locking cam in order to disengage the locking cam from the catch hook on the one hand and, on the other hand, the switching plate has a locking driver for the locking cam in order to transfer the latter into the position in which the locking hook is secured in its locking position. Owing to a suitable convex construction of the support cam which is supported at the support pin of the stationary articulated part, the releasing torque acting on the locking cam is reinforced when the switching plate is swiveled in the releasing direction. However, a swiveling of the switching plate and of the locking cam connected with it relative to the pin which is fixed with respect to the articulated part is made possible by means of a deflecting movement of the switching plate via its elongated hole. Accordingly, the high adhesion friction brought about between the catch hook and the locking cam by the introduction of motion can be achieved by introducing a smaller force into the tension member than that required in the prior art.

In order to arrange a relatively short support pin for the support cam at the stationary articulated part on the one hand and to achieve a supporting contact of the switching plate at the broad side of the locking cam on the other hand, the support cam is preferably the outer contour of a leg of the switching plate which is bent in the plane of the locking cam. For this purpose, the end face of the bend of the switching plate facing away from the catch hook advantageously forms the driver face by means of which the release projection acts upon the locking cam.

For the purpose of returning the locking cam to its secured position at the catch hook, the locking driver of the locking plate is arranged on the side opposite the support cam and is constructed as an angle leg which is bent out of the plane of the switching plate and which acts upon this locking cam at the side located opposite to the release projection in order to return the locking cam to its locking position.

In the interest of simplifying manufacture, the axle stub engaging in a bore hole of the locking cam is pressed out of the switching plate to form the bearing between the switching plate and the locking cam. For this purpose, the switching plate advantageously has a hook-in notch under its axle stub for the spring element which is held at the catch lever, so that a locking torque can be introduced by means of this spring element, by means of which locking torque first the switching plate and then the locking cam are swiveled in the locking direction by means of the switching plate. The switching plate advantageously has, under its axle stub and under its hook-in opening, a connection eye for a tension member.

The invention is shown in an embodiment example in the drawings and is described more fully hereinafter.

BRIEF DESCRIPTION OF THE DRAWINGS

In the drawings:

FIG. 1 shows a side view of the stationary articulated part of the articulated fitting with the catch hook arrangement and its locking arrangement in the locking position;

FIG. 1A shows the locking arrangement in a longitudinal section according to line IA—IA of FIG. 1;

FIG. 2 shows the articulated part according to FIG. 1 at the start of unlocking;

DESCRIPTION OF THE PREFERRED EMBODIMENTS

Figure 3:
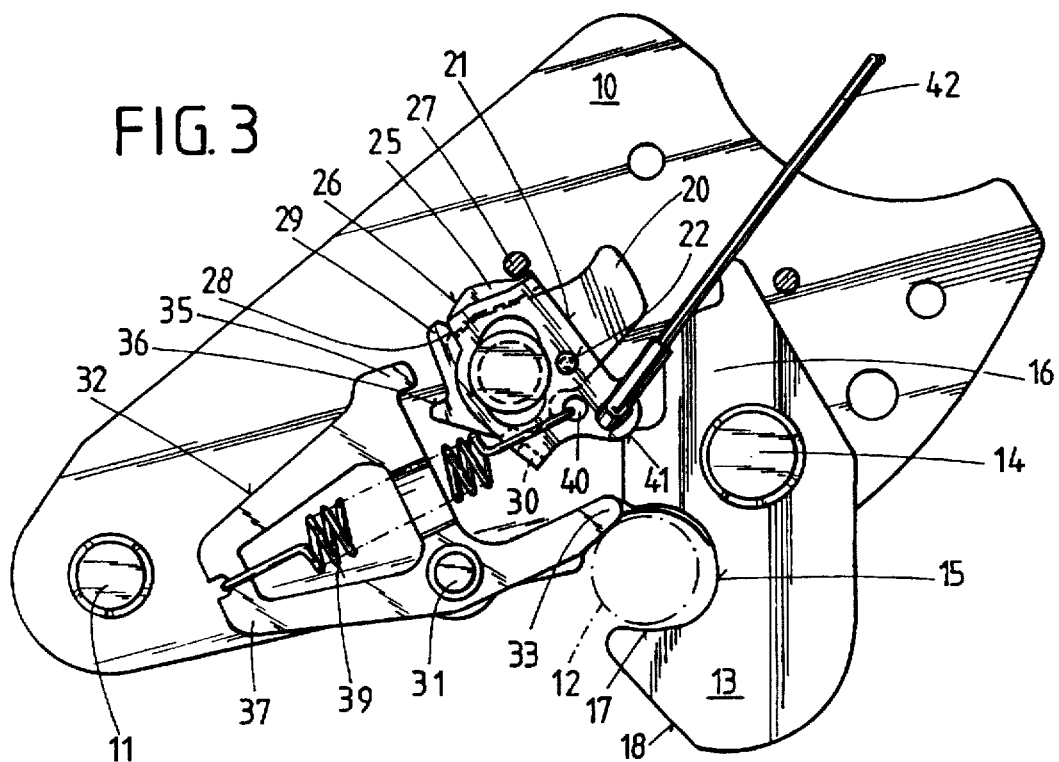
FIG. 3 shows the articulated part according to FIGS. 1 and 2 in its unlocked position.

As is well-known, the articulated fitting forms, with respect to the forward swiveling of the backrest, an inherently rigid unit which is fixed with respect to the backrest part and can be swiveled in its entirety about a bearing pin 11 which is secured to the seat part, not shown, with the stationary articulated part 10. For this purpose, there is generally an articulated fitting on each longitudinal side of the seat, at least the stationary articulated part 10 of each articulated fitting being outfitted with a catch hook arrangement.

In the use position shown in FIG. 1, the stationary articulated part 10 is supported externally at the bearing pin 11 by its lower edge at a pin-shaped stop 12 which is fastened to the seat part so as to be stationary. A catch hook 13 is provided in order to prevent the backrest from being swiveled forward unintentionally. In the locking position, the catch hook 13 engages the stop 12 at the circumferential region located opposite the support region for the stationary articulated part. The catch hook 13 is swivelable about an axle pin 14 which is fixed at the stationary articulated part 10 approximately above the edge region supported at the stop 12. The catch hook 13 is designed as a two-sided lever and has a hook jaw 15 on one side and a support arm 16 on the other side. The contact surface 17 of the hook jaw 15 contacting the stop 12 is inclined in a known manner so that its angle of slope lies above the self-locking region.

The hook jaw 15 has an opening slope 18 at its outer side located opposite to the stop surface 17 so that the catch hook 13 can deflect into an opening position when the backrest, and accordingly the stationary articulated part 10, is swiveled back. As a result of the opening slope 18, the catch hook automatically moves into its opening position when the stationary articulated part 10 is swiveled in the clockwise direction and the catch hook contacts the stop 12 above the latter.

Another pin 19 which is fixed at the stationary articulated part 10 is located between the bearing pin 11 and the axle pin 14. A locking cam 20 is supported on the pin 19 and is connected with a switching plate 21 which also engages around the pin 19. The switching plate 21 is rotatably supported at the locking cam 20 by means of an axle stub 22 in that the axle stub 22 engages in a bore hole 23 of the locking cam 20. Further, the switching plate has an elongated hole 24 which is curved around the axle stub 22. The switching plate 21 engages the pin 19 by means of this elongated hole 24. The longitudinal extension of the switching plate 21 runs approximately transverse to the longitudinal extension of the locking cam 20. The switching plate 21 is bent at its upper, narrow side and has a leg 25 which is set back in the plane of the locking cam 20, its outer contour forming a support cam 26 having a roughly convex shape. This support cam 26 contacts a support pin 27 which is fixed with respect to the articulated part and is shown by shading in the drawing. One front side of the bend of the switching plate 21 is a driver face 28 which contacts a release projection 29 of the locking cam 20 in order to release this locking cam 20. On the side opposite the leg 25, the switching plate 21 has, at its corner region facing away from the catch hook 13, an angle leg which is bent out of the plane of the switching plate and which forms a locking driver 30 which acts on the locking cam 20 in the clockwise direction when the locking cam 20 is moved into the locking position shown in FIG. 1.

Another bearing pin 31 is arranged below the pin 19 at the stationary articulated part 10. A catch lever 32 is supported on this bearing pin 31. This catch lever 32 has a control arm 33 on one side which, in the position shown in FIGS. 1, 2, 3 and 6, contacts the upper side of the stop 12 which is fixed with respect to the seat part. The catch lever 32 has a catch arm 34 approximately at a right angle to the control arm 33. This catch arm 345 has, at its upper end, a protruding catch projection 35 which can engage in a recess 36 of the locking cam 20 in order to secure the release position of the locking cam 20. The catch arm 34 and the control arm 33 of the catch lever 22 are connected with one another by means of a crosspiece 37 which has a hook-in notch 38 at its vertex for a spring element 39 which is designed as a tension spring. This tension spring 39 is secured by its other end to a hook-in opening 40 of the switching plate 21. This hook-in opening 40 is located below the axle stub 22 and also below the elongated hole 24 at the switching plate 21. Further, a connection eye 41 serving to hold a tension member 42 for the introduction of the releasing movement is located at the switching plate 21 below the hook-in opening 40. Another stop pin 44 is arranged at the stationary articulated part 10. This stop pin 44 holds the catch hook in such a position when the articulated part 10 is swiveled forward that, when swiveling back, its control face 18 can contact the stop 12 which is fixed with respect to the seat part such that an opening movement of the catch hook is possible. This stop pin 44 is also shown in shading in the drawing.

FIG. 1 shows the locking position of the stationary articulated part 10 of the articulated fitting at the stop 12 which is fixed with respect to the seat part. A recess at the underside of the stationary articulated part 10 contacts the upper side of the stop 12, while the catch hook 13 engages the stop 12 by its hook jaw 15 such that its contact face 17 contacts the underside of the stop 12. This locking position is secured by means of the locking cam 20. The contact-pressure face of the locking cam 20 which ascends in a spiral-shaped manner is pressed against the support arm 16 of the catch hook 13 by the force of the tension spring 39. This tension spring 39 tends to rotate the switching plate 21 in the clockwise direction so that the switching plate 21 which is swivelable about the axle stub 22 relative to the locking cam 20 acts upon the locking cam 20 by its locking driver 30, likewise in the clockwise direction. The tension spring 39 further ensures that the catch lever 32, which is swivelable about the bearing pin 31, contacts the upper side of the stop 12 by its control arm 33.

In the position shown in FIG. 1, the support cam 26 contacts the support pin 27 by its front region. This results in a diametrical support of the switching plate at the support pin 27 and at the locking driver 30 so that the axle stub 22 is also located in a securing position so that the locking cam 20 is secured in its clamping position at the catch hook 13.

In order to release this locking position, the user first introduces a tensile force into the tension member 42 so that the switching plate 21 is rotated about the axle stub 22 in the counterclockwise direction relative to the locking cam 20. In so doing, the ascending support cam 26 wanders forward below the support pin 27 and the switching plate 21 is pressed down as a result of its non-rigid support at the pin 19 due to the elongated hole, so that the locking driver 30 is freed from its stop face at the locking cam 20 and the driver surface 28 of the switching plate 21 strikes the release projection 29. In this case, the support cam 26 strikes the support pin 27 at the highest point of the support cam 27. This release position occurring at the start of the unlocking process is shown in FIG. 2.

With a continuous introduction of force into the tension member 42, the switching plate 21 carries the locking cam 20 along in the counterclockwise direction. The support cam 26 at the switching plate 21 then traverses the descending curve segment while being supported at the support pin 27 until the end region of the support cam 26 limits the switching path, the locking cam 20 being swiveled in the counterclockwise direction until the support arm 16 of the catch hook 13 is completely released. This situation is shown in FIG. 3

Figure 4:
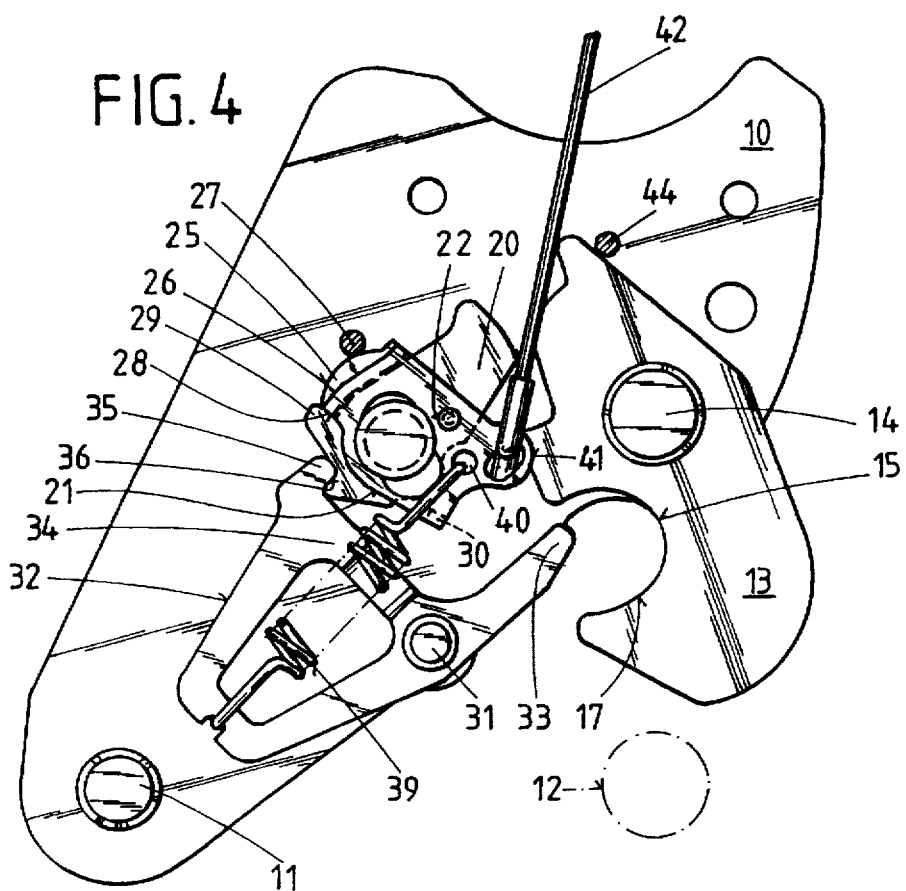
FIG. 4 shows the articulated part in its swiveled forward position.

The backrest can now be swiveled forward without resistance, so-to-speak, since the catch hook can slide off the stop 12 along the stop face 17 of its hook jaw so that the backrest and stationary articulated part 10 finally reach the folded forward position shown in FIG. 4. As soon as the control arm 33 is free of the upper edge of the stop 12, the catch lever 32 is swiveled in the clockwise direction due to the tension spring 39 and its catch projection 35 which is located in the catch arm 34 enters the recess 36 at the locking cam 20 and holds this locking cam in the freely swiveling position relative to the catch hook 13 which now contacts the stop pin 44, thereby preventing the catch hook from swiveling as a result of the force of gravity and its center-of-gravity position into a position in which it is not able to slide over the stop 12 when the backrest and stationary articulated part 10 are swiveled back. This situation is shown in FIG. 4.

Figure 5:
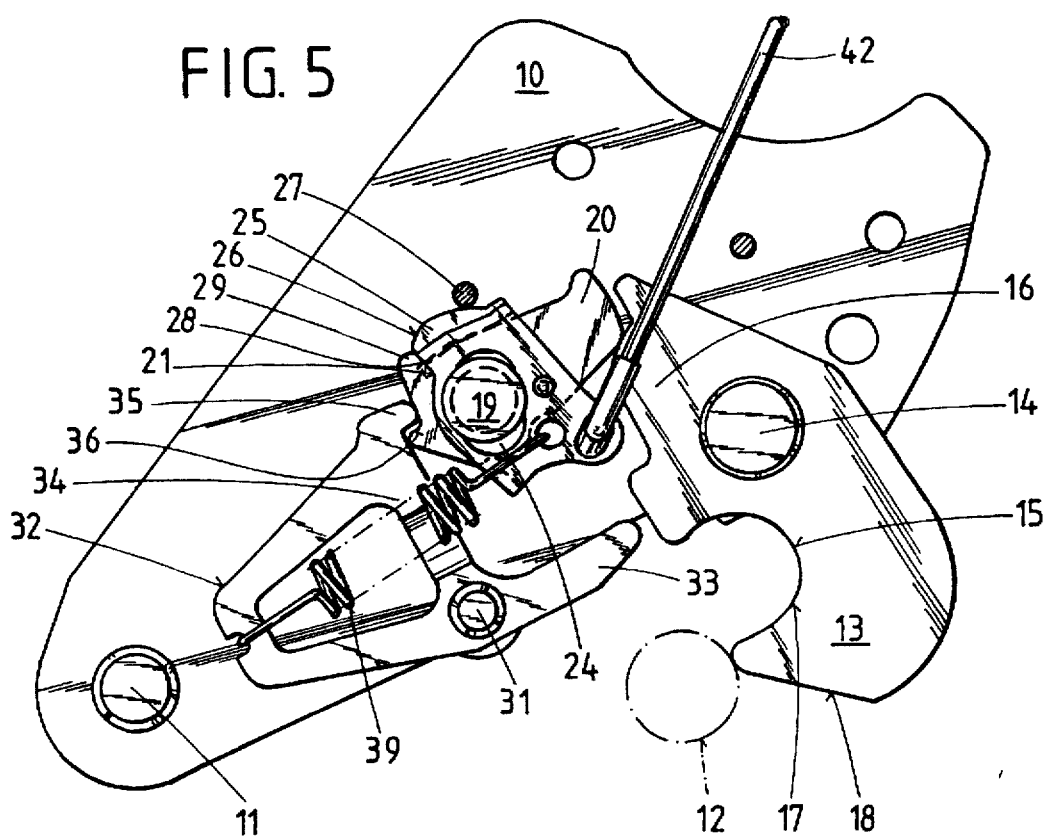
FIG. 5 shows the articulated part shown in the above-mentioned figures during the phase of swiveling back.

When the backrest swivels back into its use position, the locking arrangement remains in its present state at first so that the opening slope 18 at the hook jaw 15 of the catch hook 13 first strikes against the stop 12 and slides away from it so that the catch hook swivels into the opening position in the counterclockwise direction to engage the stop 12. This situation is shown in FIG. 5.

Figure 6:
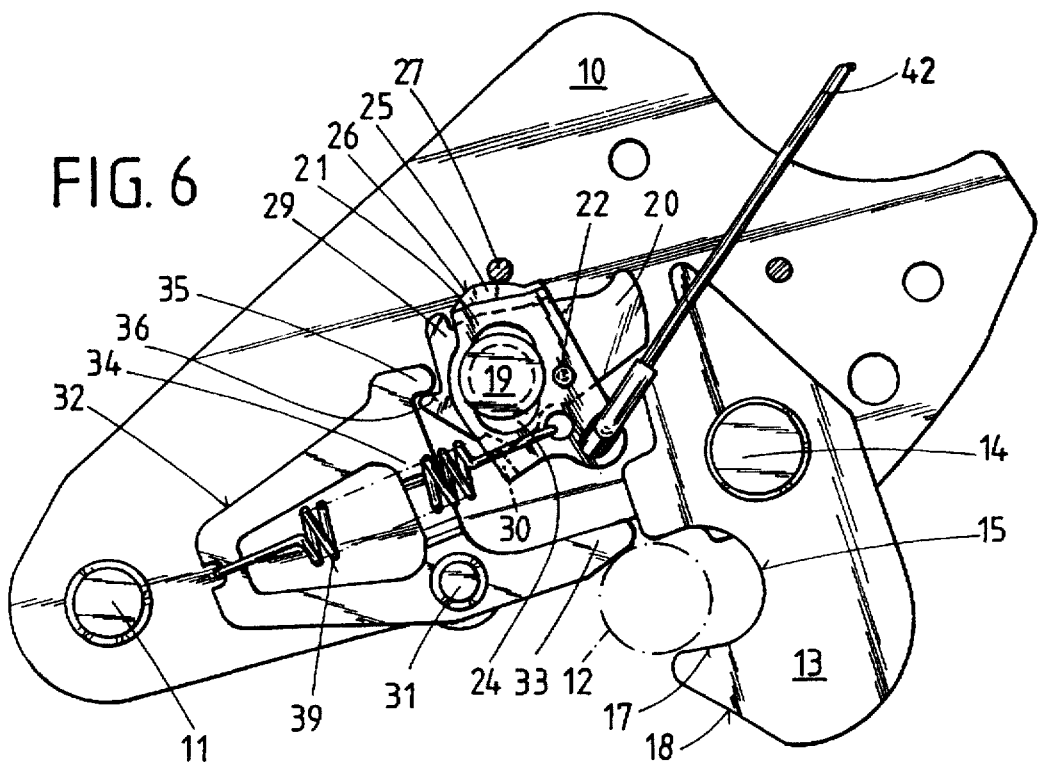
FIG. 6 shows the articulated part according to the aforementioned FIG. in a position in which it is swiveled back until the catch projection of the catch lever starts to maneuver out of the recess of the locking cam.

Finally, after swiveling back, the stationary articulated part 10 achieves a position in which the tip of the hook jaw 15 begins to engage under the stop 12, while the control arm 33 simultaneously contacts the upper side of the stop 12. This situation is shown in FIG. 6.

The position shown in FIG. 1 is resumed when the backrest is swiveled further into its use position, since, as a result of the control arm 33 of the catch lever 32, the catch projection 35 of the latter is freed from the recess 36 of the locking cam 20 so that the switching plate 21 acted upon by the tension spring 39 swivels in the clockwise direction and the switching plate is first pressed down via the elongated hole 34 by the support cam 26 supported at the support pin 27, so that the locking driver 30 acts on the locking cam 20 after a delay and only then finally presses it into the securing position shown in FIG. 1 when the locking position of the catch hook 13 is achieved. However, the locking cam 20 is first carried along in the clockwise direction via the axle stub 22 of the switching plate 1 so that the locking position shown in FIG. 1 is finally reached again.

As was already mentioned, the embodiment example shown in the drawings is only an example of the subject matter of the invention and does not limit the invention in any way. On the contrary, there are many other possible modifications and constructions of the subject matter of the invention. In particular, all of the features discussed in the description are substantial to the invention, even when not expressly claimed in the patent claims.

What is claimed is:

1. In an articulated fitting for vehicle seats, especially motor vehicle seats, having an articulated part which is swivelable with a backrest and a stationary articulated part, wherein the stationary articulated part is connected, by its front end remote of the articulated fitting, with a seat part of the vehicle seat so as to be rotatable via a swivel shaft, while its rear end region cooperates with a stop which is fixed at the seat part, and a catch hook provided with a hook jaw is swivelably articulated at the stationary articulated part, a locking arrangement being associated with the catch hook, said locking arrangement having an actuating lever which is supported at the stationary articulated part so as to be rotatable and which is loaded by a spring element in the locking direction, said actuating lever communicating with a locking cam which secures the catch hook in its locking position in which the jaw of the hook engages behind the stop in different regions thereof, and, in the locking position, a catch lever with a control arm contacting the stop is held under pretensioning by the spring element which acts upon the actuating lever in the locking direction, and, in the release position of the catch hook, the actuating lever is held by the catch lever in order to maintain this release position in that a catch arm of the catch lever engages via a catch projection in a recess of the locking cam, an improvement comprising that:

said locking cam being swivelably supported on a pin which is held at the stationary articulated part;

said locking cam supporting the actuating lever on an axle stub, which is situated on the actuating lever;

said actuating lever being a switching plate;

said axle stub being arranged at a distance radially from said pin;

wherein said switching plate, having an elongated hole which is curved around the axle stub, engages around said pin, which is fixed at the articulated part, and contacts, via a support cam situated on the switching plate, a support pin;

said support pin being fixed with respect to the articulated part to swivel the switching plate around the axle stub via contact with the support cam;

a driver face of the switching plate adapted to contact a release projection of the locking cam in order to disengage said locking cam from said catch hook when the switching plate swivels; and said switching plate having a locking driver for the locking cam in order to transfer the latter into the position in which the catch hook is secured in its locking position.

2. The articulated fitting according to claim 1, wherein the support cam is the outer contour of a leg of the switching plate which is bent in the plane of the locking cam.

3. The articulated fitting according to claim 1, wherein the end face of the bend of the switching plate facing away from the catch hook forms the driver face by which the release projection acts upon the locking cam.

4. The articulated fitting according to claim 1, wherein the locking driver of the switching plate is arranged on the side opposite the support cam and is constructed as an angle leg which is bent out of the plane of the switching plate and which acts upon this locking cam at the side located opposite to the release projection in order to return the locking cam to its locking position.

5. The articulated fitting according to claim 1, wherein the axle stub is pressed out of the switching plate and engages in a bore hole of the locking cam.

6. The articulated fitting according to claim 1, wherein the switching plate has a hook-in opening under its axle stub for the spring element which is held at the catch lever.

7. The articulated fitting according to claim 1, wherein the switching plate has, under its axle stub and under its hook-in opening, a connection eye for a tension member for introducing the releasing movement releasing the locking cam from the catch hook.

* * * * *